US011934842B2

(12) United States Patent
Robert et al.

(10) Patent No.: US 11,934,842 B2
(45) Date of Patent: Mar. 19, 2024

(54) METHOD FOR AUTOTUNING NOISY HPC SYSTEMS

(71) Applicants: BULL SAS, Les Clayes-sous-bois (FR); UNIVERSITE DE VERSAILLES SAINT-QUENTIN-EN-YVELINE, Versailles (FR)

(72) Inventors: Sophie Robert, Les Adrets (FR); Grégory Vaumourin, Grenoble (FR); Soraya Zertal, Sceaux (FR)

(73) Assignees: BULL SAS, Les Clayes-sous-Bois (FR); UNIVERSITE DE VERSAILLES SAINT-QUENTIN-EN-YVELINE, Versailles (FR)

( * ) Notice: Subject to any disclaimer, the term of this patent is extended or adjusted under 35 U.S.C. 154(b) by 248 days.

(21) Appl. No.: 17/498,715

(22) Filed: Oct. 11, 2021

(65) Prior Publication Data

US 2022/0113981 A1 Apr. 14, 2022

(30) Foreign Application Priority Data

Oct. 9, 2020 (EP) .................................... 20306185

(51) Int. Cl.
*G06F 9/4401* (2018.01)
(52) U.S. Cl.
CPC ................ *G06F 9/4403* (2013.01)
(58) Field of Classification Search
CPC .................................................. G06F 9/4403
See application file for complete search history.

(56) References Cited

U.S. PATENT DOCUMENTS

| | | | | |
|---|---|---|---|---|
| 8,954,309 | B2* | 2/2015 | B'Far | G06F 11/3447 703/22 |
| 9,734,036 | B2* | 8/2017 | Baughman | H04L 41/083 |
| 10,366,053 | B1* | 7/2019 | Zheng | G06N 20/00 |
| 2009/0144744 | A1* | 6/2009 | Gunnels | G06F 9/4881 703/20 |
| 2015/0317240 | A1* | 11/2015 | Li | G06F 8/443 714/38.1 |
| 2016/0342888 | A1* | 11/2016 | Yang | G06V 10/454 |

OTHER PUBLICATIONS

European Search Report issued in EP20306185.8 dated Mar. 26, 2021 (12 pages).

(Continued)

*Primary Examiner* — Gary Collins
(74) *Attorney, Agent, or Firm* — ARC IP Law, PC; Joseph J. Mayo (57) ABSTRACT

A method for iteratively autotuning a high-performance computing system that depends on a set of parameters. Performance is first evaluated two or more times with the current values of the parameters. Afterward at least two evaluations, the median performance is evaluated. The median is then tested against a rule based on a filtering threshold. If the median does not the rule, the current values of the parameters are discarded, and the method is restarted with at least one other value generated by an optimization module; otherwise, a resampling method is performed based on the median and on a confidence interval that decreases with the number of steps of the optimization method.

9 Claims, 7 Drawing Sheets

(56) References Cited

OTHER PUBLICATIONS

Behzad, et al, "Taming Parallel I/O Complexity With Auto-Tuning", 2013 Sc—International Conference For High Performance Computing, Networking, Storage and Analysis (Sc), Nov. 17, 2013 (pp. 1-12).

Srivisut, et al, "Dependent Input Sampling Strategies", Jul. 2, 2018, pp. 1451-1458.

Rodehorst V et al: "Genetic Algorithm Sample Consensus (Gasac)—A Parallel Strategy for Robust Parameter Estimation", Computer Vision and Pattern Recognition Workshop, 2006 Conference Jun. 17, 2006; p. 103.

Zheng, et al, "Stability Competitive Adaptive Reweighted-Sampling (Scars) and Its Applications Ot Multivariate Calibration of Nir Spectra" Chemometrics and Intelligent Laboratory Systems, Elsevier Science Publishers; Jan. 8, 2012, pp. 48-54.

Robert, et al., *Auto-tuning of IO accelerators using black-box optimization* Proceedings of the International Conference on High Performance Computing & Simulation (HPCS), 2019 (6 pages).

Di Pietro, et al., *Applying Evolutionary Algorithms to Problems with Noisy, Time-consuming Fitness Functions*, 2004 (8 pages).

Doerr, et al., "*When Resampling to Cope with Noise, Use Median, Not Mean*" In Proceedings of the Genetic and Evolutionary Computation Conference, 2019. https://doi.org/10.1145/3321707.3321837.

Geyer, Charles J., "*Stat 5102 Notes: Nonparametric Tests and Confidence Intervals*", s. d., 14.

\* cited by examiner

METHOD FOR AUTOTUNING NOISY HPC SYSTEMS

This application claims priority to European Patent Application Number EP20306185.8, filed 9 Oct. 2020, the specification of which is hereby incorporated herein by reference.

BACKGROUND OF THE INVENTION

Field of the Invention

The technical field of the invention is the field of high-performance computing, also known as "HPC".

The present document concerns a method for the auto-tuning of noisy high-performance computers, and in particular an adaptative resampling method for autotuning noisy high-performance computing systems.

Description of the Related Art

Modern computer systems, both hardware and software, come with many tunable parameters and their parameterization can have a huge impact on their performance. This is especially true for the case of HPC systems, where performance is one of the most important concern. Making sure that the parametrization of the system is optimal is thus crucial to the proper operation of an HPC system, such as an HPC cluster. In the rest of the description, the terms "HPC", "High-Performance Computer", "HPC system" or "HPC cluster" will be used interchangeably to refer to a system permitting high performance computing.

Many components of an HPC can be parametrized, for example MPIs ("Message Passing Interfaces"), I/O ("Input/Output") accelerators, storage bays etc. A set of parameters can be determined for each application running on the HPC and using a component, or for each type of applications, to maximize the performance measurement of the application(s). Such parameters are usually used to define and modify the behaviour of the components and how they interact with their environment, and can comprise, for the case of a burst buffer:
- the number of workers: the size of the worker threads pool used to transfer the data from the compute nodes to the Data node,
- the number of destagers: the size of the destager threads pool used to transfer the data from the Data node to the parallel filesystem,
- the cache size: the size of the allocated RAM cache on the Data node
- the cache threshold: the fraction of used RAM cache before starting to remove clean data from the burst buffer's cache in order to make room for the other incoming I/O.

For the case of a software I/O accelerator (also called Small Read Optimizer):
- the sequence length: the number of access stored in memory,
- the binsize: the size of the conceptual file zones,
- the cluster threshold: the number of operations required in a given zone to so trigger the pre-fetching mechanism,
- the prefetch size: the size of the zone that will be prefetched.

For the case of a storage bay, examples of parameters can be the type of file system, the block size, the sector size, the block group, the journal option, the I/O scheduler.

It is understood by "environment" of a component, the user applications, the execution software modules, the workload, etc., which makes the adaptation of the parameters specific to each situation.

Figure 1:
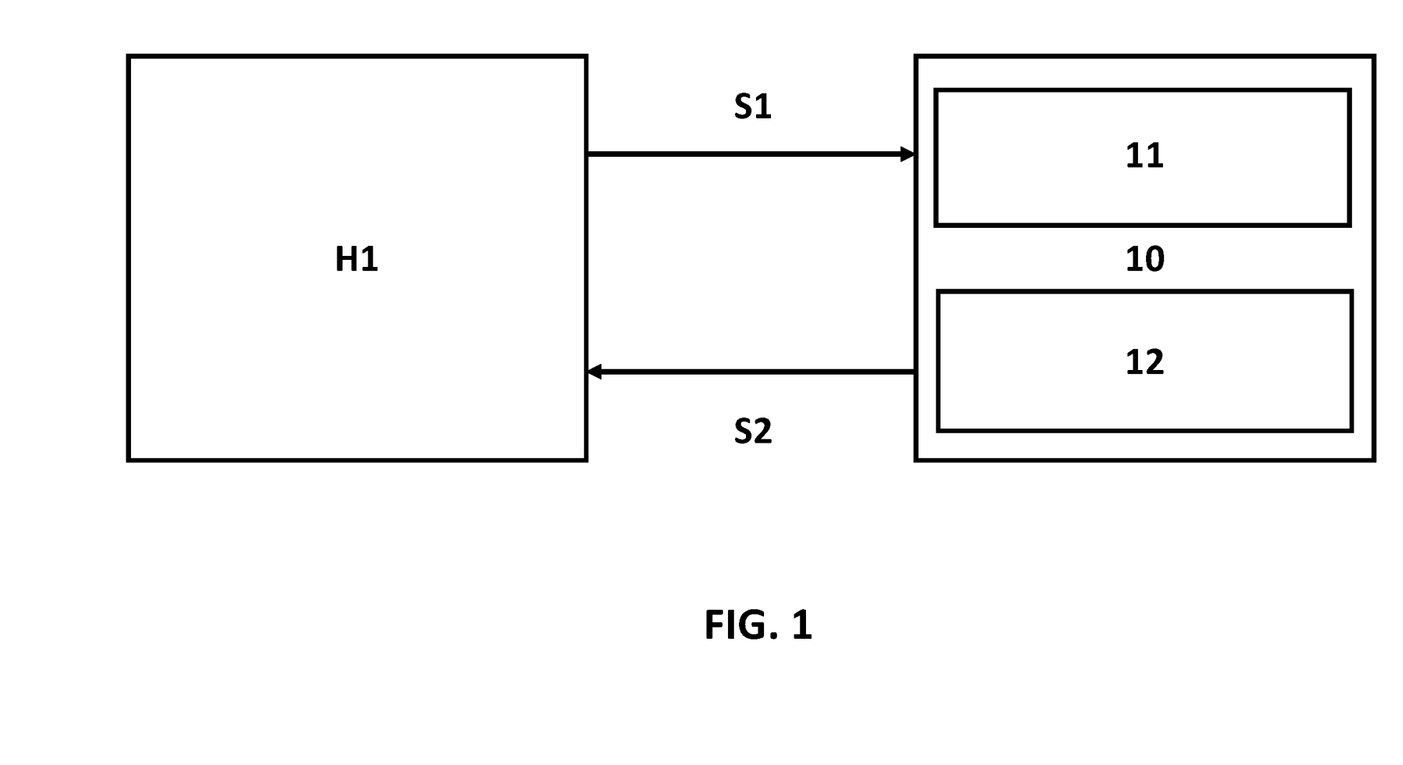
FIG. 1 is a schematic representation of a known black-box optimization method.

To find an optimal parametrization, auto-tuning methods relying on black-box optimization have delivered good results in many different computer science fields, including HPC. Black-box optimization refers to the optimization of a function of unknown properties, costly to evaluate most of the time, which entails a limited number of possible evaluations. This type of optimization method consists of looking at the component to be tuned as a black-box which iteratively yields a performance measure, until a certain optimization budget is spent. The black-box optimization heuristic then selects accordingly the next most promising parametrization that should be evaluated, as represented in FIG. 1. In FIG. 1, the black-box 10 comprises an HPC system 11 which comprises a tuned component 112, such as an I/O accelerator. The heuristic method M1 optimizes the parameters of the tuned component(s) by iteratively selecting a new parametrization at a step S1 and receiving a performance measure at step S2. While a predefined optimization budget, for example a predefined number of iterations, is not spent, the heuristic M1 keeps trying new parametrizations. Known heuristics M1, such as Bayesian optimization, genetic algorithms and simulated annealing, can and have been used with good results in various fields, as one of the main strengths of the algorithm is its agnosticism to the undergoing tuning of the systems. It also has been shown in previous studies (for example in Robert, S., S. Zertal, et G. Goret. «*Auto-tuning of IO accelerators using black-box optimization*» in Proceedings of the International Conference on High Performance Computing & Simulation (HPCS), 2019) that black-box optimization is a very promising tool for tuning I/O accelerators for HPC systems. I/O accelerators range from pure software components to mixed hardware and software components and enable better I/O performances in HPC systems.

Figure 2:
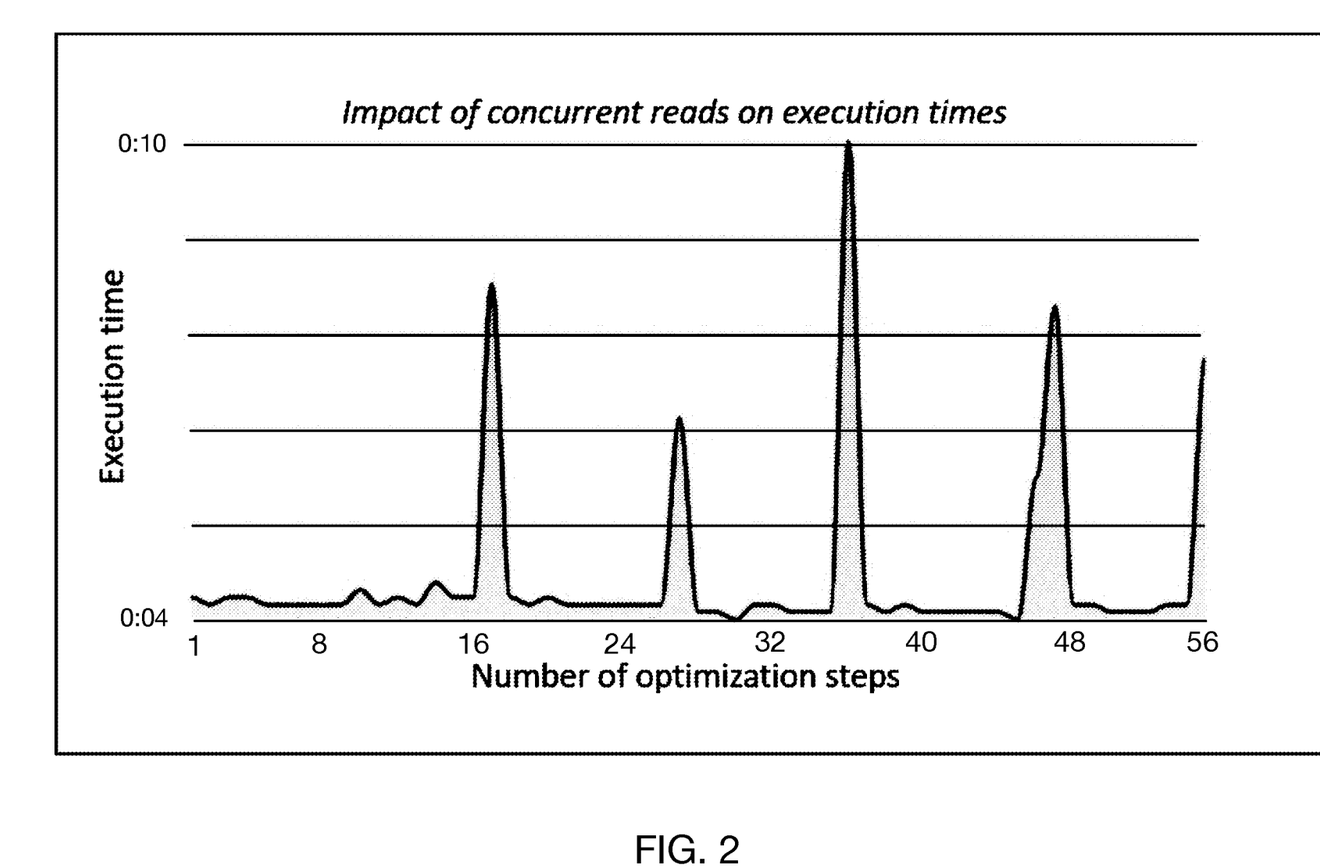
FIG. 2 is a graph representing the impact of concurrent reads on execution times in known HPC systems.

All these previous studies assume that the tuned system is deterministic, i.e. that a given parametrization will always yield the same execution time. While this hypothesis can be valid when working in a controlled test environment, it does not hold for HPC systems which share their resources with many users. Because the execution context varies, a given parametrization of the component may yield different times for each execution. For example, if looking for the optimal parametrization of an I/O accelerator, the workload currently using the storage bay will affect the running times, regardless of the parametrization of the I/O accelerator. An example of this phenomenon is shown in FIG. 2, which represents the running times of an I/O benchmark accelerated by an I/O accelerator with a constant parametrization. A parallel process reads the same file as the I/O benchmark and this perturbation causes a significant time variation under the same environment configuration. This is referred to as "noise" and an HPC system experiencing such difficulties is referred to as a "noisy" HPC system. The time spent by the application can vary by as much as 150% between two running times in this example due to sharing conflicts on the file system. This scenario can be frequently encountered when running in production, as HPC workflows often rely on shared data files and can read them in parallel. The same interferences can be encountered in storage bays, for example when a user copies a big file stored in the storage bay or asks for many metadata in a short period of time.

However, it is essential to be able to use the autotuning method in an HPC system that experiences concurrent operations during the autotuning.

Consequently, it is needed to reframe the optimization problem, by giving users the parametrization that yields the best performance on average, to take into account interferences. This means that if the user were to repeat indefinitely his experiment with this parametrization, it would give him the best possible performance compared to all other parametrization.

This stochasticity degrades the performance of classical auto-tuning heuristics: the algorithm may keep, as a "good" parametrization, a "bad" parametrization that just benefitted from good condition (the cluster might have been unusually idle) and reject a "good" parametrization that was evaluated in difficult conditions. This phenomenon confuses the algorithm and greatly slows down the convergence process. As optimization techniques in HPC work with a limited number of possible evaluations because HPC applications can take a long time to run, this greatly reduces the efficiency of auto-tuning and can cause suboptimal performance.

To mitigate the problem of optimization in a noisy context, several solutions have been suggested in the literature. Some of these solutions are specific to a certain heuristic (for example, only work with suggested Bayesian optimization) and consist in enhancing this heuristic to make it more resilient to noise.

An agnostic solution to the heuristic used, is adding a "resampling filter" to the black-box optimization heuristic, which consists in re-evaluating a parametrization several times (see FIG. 3), in order to have a better idea of the performance at one point, and to consider the average of this solution to be the "true" value of the performance function of this point, i.e. the performance of a parametrization without the noise. By re-evaluating is meant to launch several times the application with a same set of parameters (parametrization) and compute each time a performance measure of the optimization to increase the precision and confidence in this parametrization point.

Figure 3:
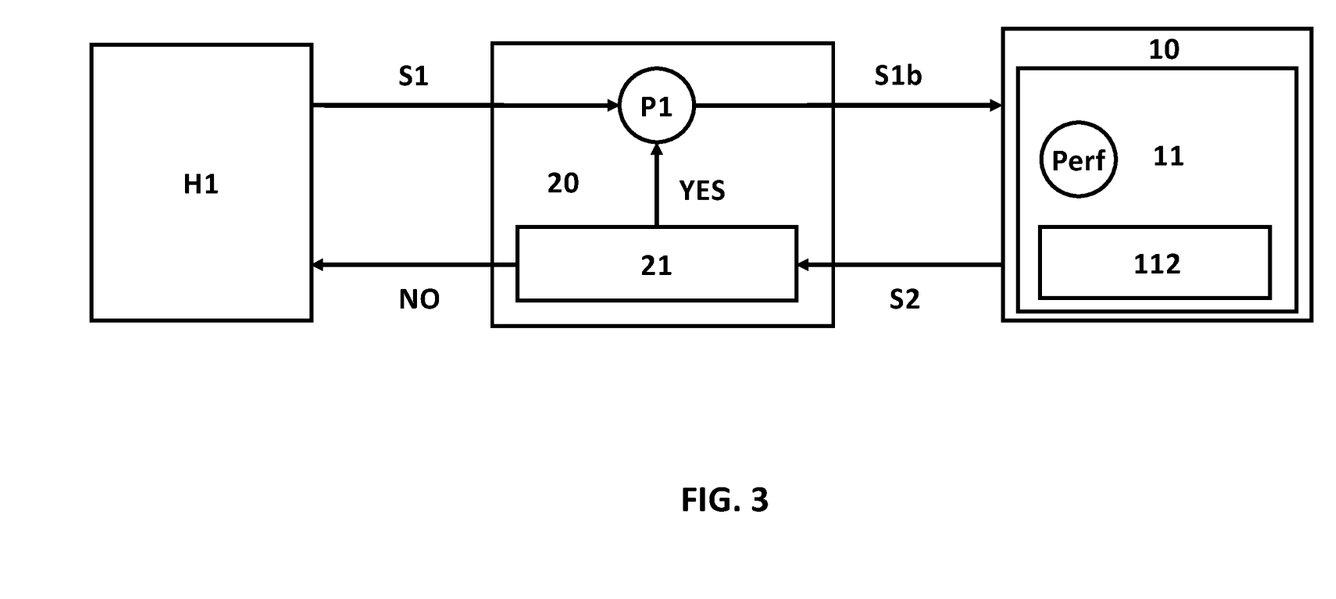
FIG. 3 is a schematic representation of a known resampling method.

Resampling has been studied in conjunction with different heuristics and in different fields. It introduces trade-off between exploring new parametrization and re-evaluating already known ones. FIG. 3 shows an example of resampling, where a computing device comprising a resampling filter 21 is added between the heuristics M1 and the black-bock 10. The reference P1 is the incoming parametrization, potentially the same as the previous parametrization, and component 21 is a re-evaluation filter that decides if the parametrization needs to be re-evaluated as a function of the performance measure of S2. At a step S1b, the parametrization is evaluated. FIG. 3 is performed a plurality of times while the optimization budget is not spent.

Two types of resampling are among the most used, because they are easy to implement and understand. The first one is static resampling, which simply consists in re-evaluating the parametrization for a fixed number of times. The second one is dynamic resampling. Dynamic resampling is described in FIG. 4, which represents the method carried out by the resampling filter 21 of FIG. 3, implemented to perform dynamic resampling. Dynamic resampling has been introduced for the first time in "Pietro, Anthony Di, Lyndon. While, et Luigi Barone, *Applying Evolutionary Algorithms to Problems with Noisy, Time-consuming Fitness Functions*, 2004."

Figure 4:
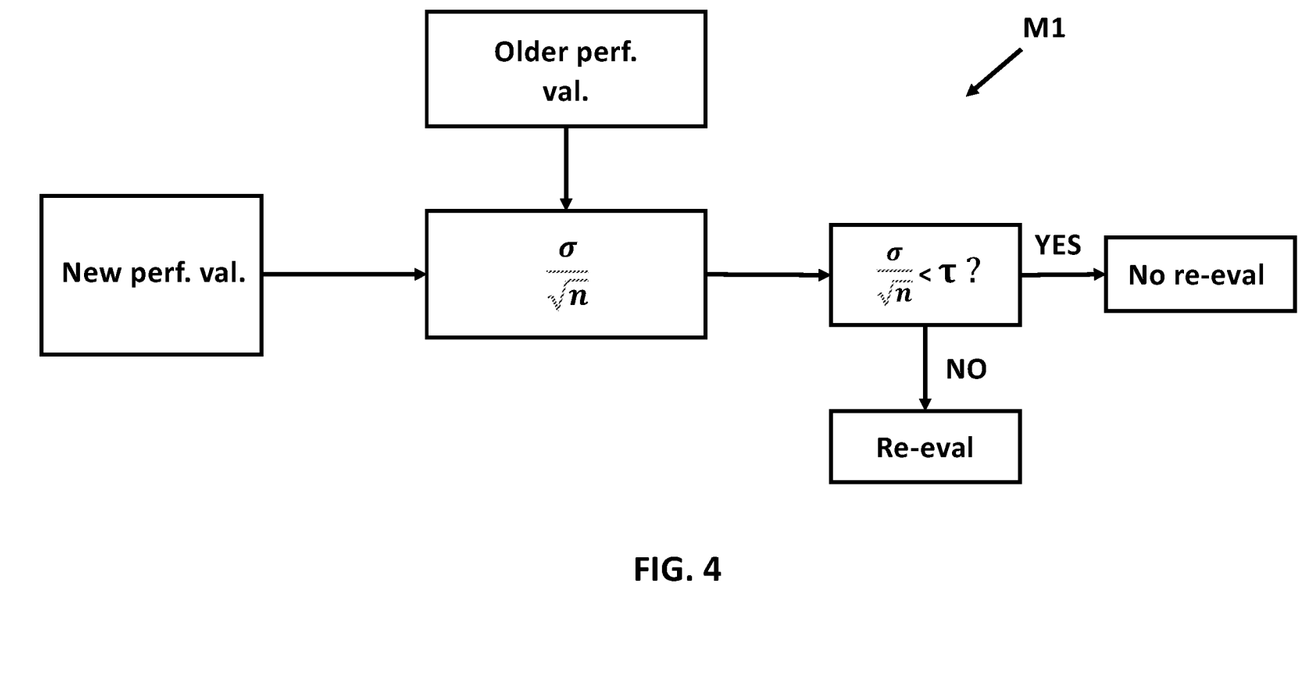
FIG. 4 is a schematic representation of a known filter implemented to perform dynamic resampling.

It consists in repeating a parametrization until the standard error of the mean falls below a certain threshold τ, as shown in Equation 1 where σ is the standard deviation and n is the number of evaluations. The threshold τ is chosen arbitrarily in the prior art.

$$\frac{\sigma}{\sqrt{n}} \leq \tau \qquad \text{Equation 1: SEDR resampling condiiton}$$

The dynamic resampling method M1 represented at FIG. 4 and carried out by the resampling filter 21 comprises a step of receiving new performance value and, using older performance values, a step of computing the standard error of the mean of the performance values measured. Then, if the result of a step of comparing the standard error of the mean ("SEM") to a threshold is that the SEM is above the threshold, a re-evaluation is carried out. If it is the contrary, no re-evaluation is carried out.

While the simplicity of implementation of dynamic resampling makes it very interesting for auto-tuning, it has several drawbacks that have to be overcome to make it more suitable for the HPC use case.

First, it does not consider the type of noise that is the most often encountered in HPC systems: "Cauchy" noise, which is characterized as very short but strong noise impulses. The mean is not an adapted estimator for this type of noise, because it can be strongly affected by outliers.

Furthermore, it does not consider the value of the function when performing resampling, that is resampling is applied in the same way regardless of the performance of a set of parameters compared to the previous tested sets of parameters. For example, it can resample several times a slow parametrization (compared to the already tested ones) and slow the convergence process of the tuning algorithm. But each run is very costly for HPC systems, in terms of time, resources and money.

Another problem is that it has a strong dependence on the threshold hyperparameter. Indeed, a too high threshold would not trigger any resampling, while a low threshold would trigger too many resampling and prevent the algorithm from exploring the parametric space.

To address the drawbacks mentioned before, there is a need for a resampling method tailored for HPC systems.

BRIEF SUMMARY OF THE INVENTION

The present invention solves the above-mentioned problems by providing a solution able to address the drawbacks of the prior art while being suitable for HPC systems.

According to a first aspect of the invention, this is satisfied by providing a method for autotuning a high-performance computing system, at least part of the high-performance computing system having an evaluable performance and being able to be parameterized using a set of parameters, each parameter having at least one value, the evaluable performance being dependent on the value of the parameters of the set of parameters, the method being carried out by a computing device, an optimization module being configured to generate at least one current value of at least one parameter of the set of parameters as a function of at least one previously measured performance of the high-performance computing system, the method being characterized in that it comprises at least the steps of:

If the performance has not been evaluated at least a predetermined number of times with the current value of the set of parameters:

Evaluating the performance of the high-performance computing system with the current value of the set of parameters, If the performance has been evaluated at least a predetermined number of times with the current value of the set of parameters:

Computing the median of the evaluated performances with the current value of the set of parameters, If the median of the evaluated performances does not verify a rule based on a filtering threshold, discard the current value of the set of parameters and restart the method with at least one other value for at least one parameter of the set of parameters generated by the optimization module, If the median of the evaluated performances verifies the rule based on the filtering threshold, performing a resampling method based on the median of the evaluated performances and on a confidence interval decreasing with the number of steps of the optimization method.

Thanks to one or more embodiments of the invention, an autotuning method is provided that is applicable to a noisy HPC system thanks to its use of the median instead of the mean of evaluated performance, enabling the method to be more resilient to the Cauchy noise observed in HPC systems. As the median does not depend on outliers, it deals well with impulse noises. It is also still resilient to other type of noise, such as Gaussian noise (as is formally proven in Doerr, Benjamin, et Andrew M. Sutton. «*When Resampling to Cope with Noise, Use Median, Not Mean*». In Proceedings of the Genetic and Evolutionary Computation Conference, 242 48. Prague Czech Republic: ACM, 2019. https://doi.org/10.1145/3321707.3321837).

Further, in one or more embodiments of the present invention, the performance is evaluated a predetermined number of times before performing any resampling, and the median of the evaluations is computed, enabling to quickly discard values of sets of parameters that are not suitable for the optimization of the HPC system. This permits to reduce resources by only testing a limited number of times values of sets of parameters that would require long execution time. The goal is to filter the most promising parametrizations before submitting them to the resampling which reduces the time and execution cost of the resampling method. This filtering ensures that no optimization budget is wasted on slow parametrizations compared to the rest of the evaluated ones. Discarding values for a set of parameters or part of the set of parameters is performed by comparing the median of the two evaluations to a filtering threshold, the filtering threshold being computed using a decreasing function of the number of elapsed iterations, permitting to become more strict about the quality of the resampled solutions as the optimization progresses (that is, the filtering ratio reduces). This ensures that, as the optimization process draws to an end, no remaining resources are wasted.

Furthermore, compared to the prior art, the resampling method is also modified. As explained previously, it is the standard error of the median instead of the standard error of the mean that is used, and the confidence interval is, in one or more embodiments of the invention, decreasing with the number of iterations, so as to ensure that at the beginning of the optimization process, the precision is large, as many different parametrization are wished to be tested at first (exploration) but at the end of the optimization process, a more precise knowledge about the parametrization is needed (exploitation). This has three benefits: a strong exploration component of the algorithm at the beginning of the optimization process is kept, a final knowledge of final parametrizations is ensured and no external hyperparameter has to be set, as opposed to the prior art.

The method according to one or more embodiments of the invention may also have one or more of the following characteristics, considered individually or according to any technically possible combinations thereof:

the predetermined number of times the performance has to be evaluated is two, the method further comprises, after the step of computing the median of the evaluated performances, a step of computing a value of the filtering threshold based on a decreasing function and on the median of the evaluated performances for all values of the set of parameters.

the rule based on the filtering threshold is taken in the following group: a rule verified if the evaluated performance is above the filtering threshold, a rule verified if the evaluated performance is under the filtering threshold or a rule verified if the evaluated performance is equal to the filtering threshold.

the resampling method comprises a first step of evaluating the performance of the high-performance computing system with the current value of the set of parameters, and if the standard error of the median of the evaluated performances with the current value of the set of parameters does not verify the rule based on the confidence interval, performing the resampling method again or, if the standard error of the median of the evaluated performances for the current value of the set of parameters verifies the rule based on the confidence interval, stopping the resampling method for the current value of the set of parameters.

the confidence interval of the rule based on the confidence interval is computed based on a decreasing function such as a logarithmic function or a decreasing exponential function.

Another aspect of the invention relates to a system for autotuning a high-performance computing system characterized in that it comprises at least one optimization module and at least one computing device configured to carry out the method according to the invention.

Another aspect of the invention relates to a computer program product comprising instructions which, when the program is executed by a computer, causes the computer to carry out the method according to the invention.

Another aspect of the invention relates to a computer-readable medium comprising instructions which, when executed by a computer, cause the computer to carry out the method according to the invention.

The invention finds a particular interest when autotuning an HPC system that experiences interferences during the autotuning.

BRIEF DESCRIPTION OF THE DRAWINGS

Other characteristics and advantages of the invention will become clear from the description that is given thereof below, by way of indication and in no way limiting, with reference to the appended figures, among which.

DETAILED DESCRIPTION OF THE INVENTION

For greater clarity, identical or similar elements are marked by identical reference signs in all of the figures.

Figure 5:
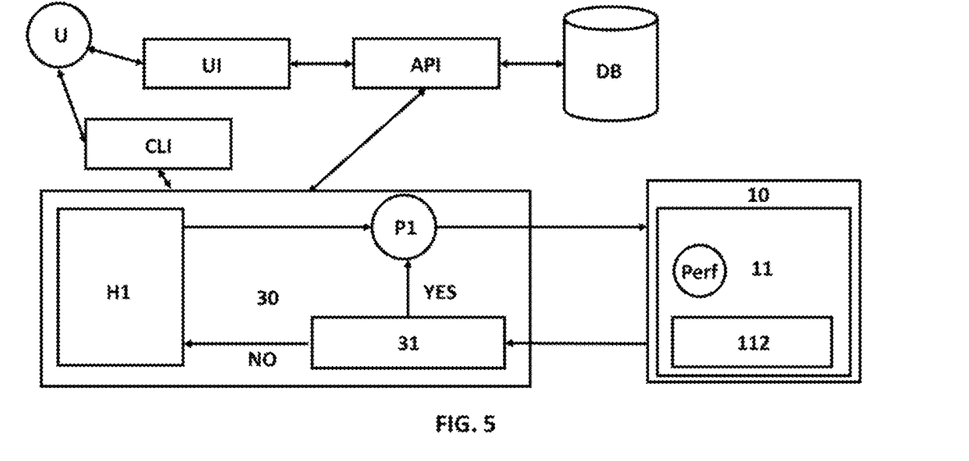
FIG. 5 is a schematic representation of the system configured to carry out the autotuning method according to one or more embodiments of the invention.

FIG. 5 presents a system configured to carry out the autotuning method of one or more embodiments of the invention.

The system comprises a high-performance computing system 11 comprising a tuned component 112 or a plurality of tuned components 112. A high-performance computing system 11 can comprise several cabinets, each cabinet comprising several racks such as computing racks and/or storage racks. The cabinets are linked using interconnection devices such as network switches. The racks are also linked using interconnection devices such as network switches. The invention covers any kind of system that can provide high-performance computing. The high-performance computing system 11 or one of its components 112 has an evaluable performance Perf, for example the running time of an application, the measured bandwidth of an application, the energy cost of running the application, the time spent doing Inputs/Outputs by the application, and is parameterizable through a set of parameters. The set of parameters can comprise for example parameters described in the prior art section but is not limited to said parameters. Parameters can be numerical (integer or floating-point), Boolean, text, timestamps, or any other type of parameter. A HPC system 11 or its components 112 is parameterized when at least one of the parameters of its set of parameters is allocated a value. An ensemble of values of the set of parameters can also be called a "parametrization". It is understood by a "value" any label allocated to a parameter. For example, for a Boolean, a value is 1 or 0 or "yes" or "no". For a text field, a value is any string. At least one parameter of the set of parameters can have a default value. The same parameter can have several values.

The system of FIG. 5 further comprises a computing device 30 comprising a dynamic resampling filter 31 and an optimization module H1 configured to generate at least one current value of at least one parameter of the set of parameters P1. It is understood by "current value" a value of at least one parameter at the current step of the autotuning method, the autotuning method being iterative. "current value" of at least one parameter can represent several values of several parameters of the set of parameters. The optimization module H1 can generate one new value for one parameter of the set of parameters P1, several new values for several parameters of the set of parameters P1, or a new value for each of the parameters of the set of parameters P1. This optimization module H1 being known in the prior art, the description will focus on the autotuning method of the invention. The computing device 30 can comprise the optimization module H1 as represented at FIG. 5, or the optimization module and the computing device can be two different devices, as represented at FIG. 3. The invention covers both implementations.

The optimization module H1 comprises optimization libraries, that can be manipulated by a user U through a command line interface CLI or through a configuration system as represented at FIG. 5. The configuration system can be deployed as a Web service comprising a user interface UI, a persistent storage such as a database DB and an application programming interface API which ensures the communication between both components UI and DB and the optimization module H1.

Submission of a new optimization experiment can be made by user U through the command line interface CLI or through the configuration system, by selecting the application, piece of software, or piece of hardware to optimize, the maximum number of iterations, and the configuration of the search process (such as optimization heuristic, noise reduction strategy, pruning strategy . . . ).

A visual exploration of running and finished optimization experiments can be carried out through the Web service using the user interface UI. Therefore, it is possible for a user to visualize the optimization trajectory in real-time for a running experiment as well as the different choices made by the optimizer (tested parameters, resampling and pruning choices . . . ). Different metadata associated with the experiment can also be displayed such as the current configuration.

Figure 6:
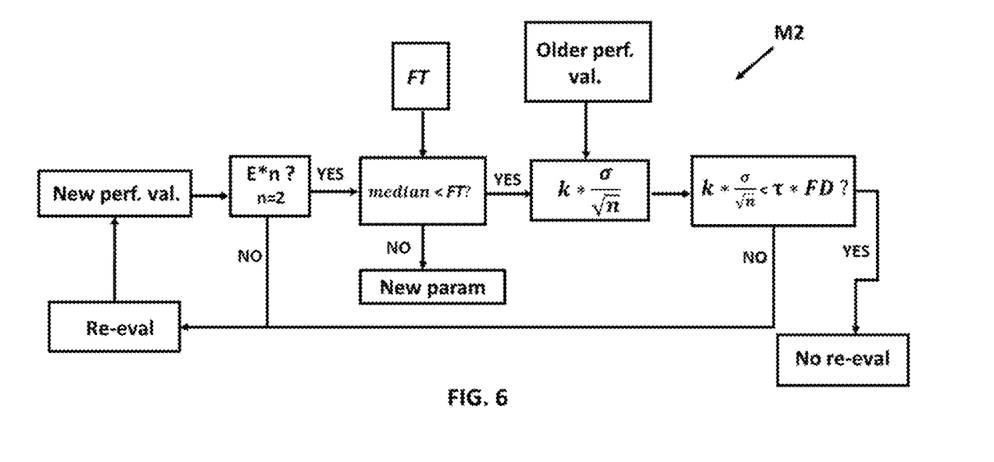
FIG. 6 is a schematic representation of the autotuning method according to one or more embodiments of the invention.

The autotuning method M2 represented at FIG. 6 is carried out by the computing device 30 for one value or an ensemble of values of the set of parameters of the HPC system 11, that is for one parametrization. The autotuning method M2 is started back at the first step at each change of parametrization made by the optimization module H1.

The autotuning method M2 of FIG. 6 comprises a first step of receiving a new performance value. This new performance value is associated to a value of the set of parameters P1, that is it is associated with the value of the set of parameters P1 with which the high-performance computing system 11 is parameterized when evaluating the performance of the HPC system 11. With this current value of the set of parameters, the autotuning method M2 according to one or more embodiments of the invention comprises a second step "E*n?" of verifying if the performance Perf of the HPC system 11 has been evaluated at least a predetermined number of times n. If the method M2 represented at FIG. 6 shows that the performance evaluation has been carried out twice, one or more embodiments of the invention also cover steps where the test is to verify that the performance has been evaluated a predetermined number of times, preferably small compared to the resampling procedure. This can be changed using a parameter n where the performance must have been evaluated n times before carrying on with the rest of the method M2. If the performance Perf has not been evaluated n times, the performance is evaluated another time. If the performance has been evaluated n times, the method carries on with the following step.

Figure 7:
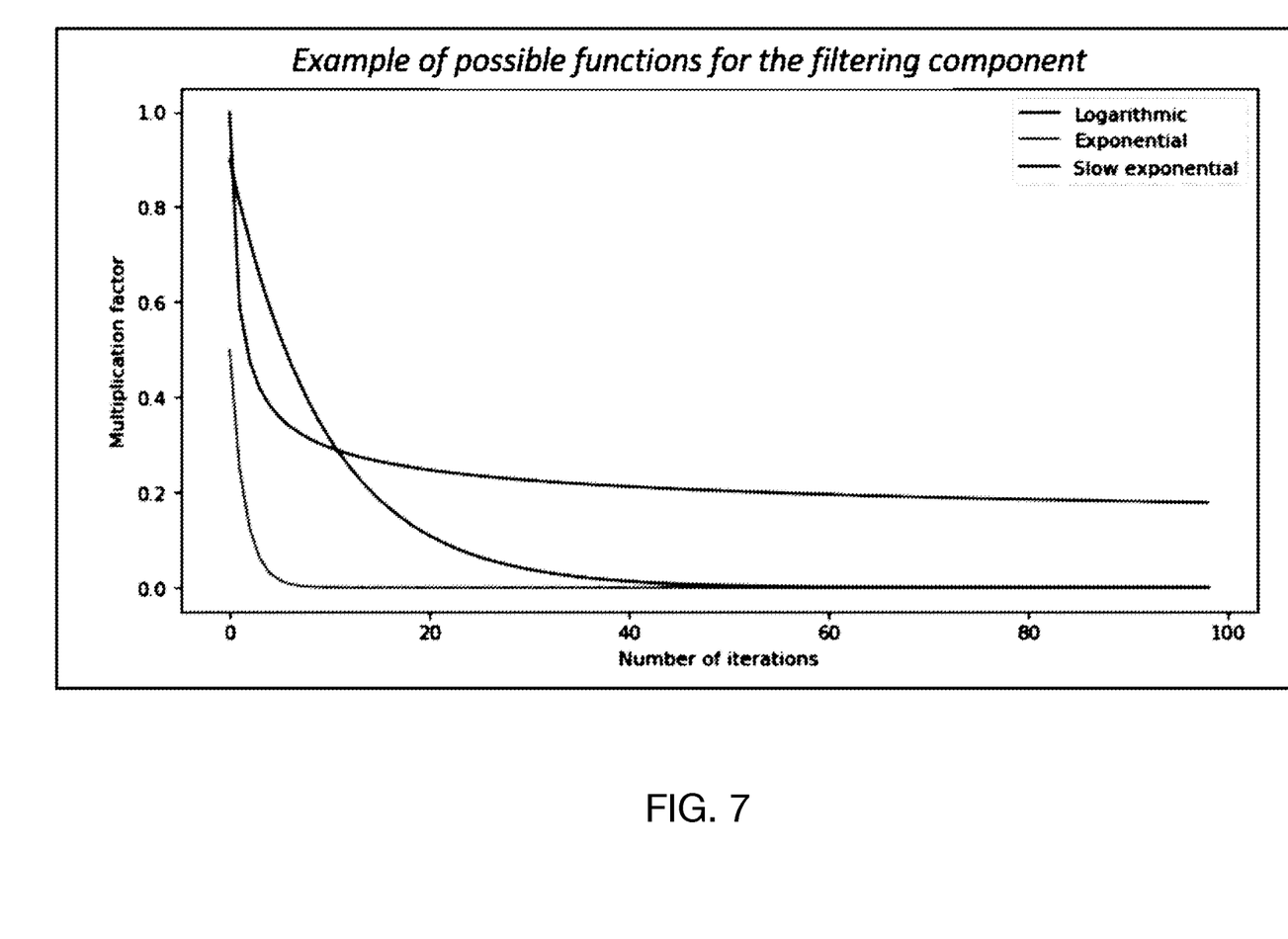
FIG. 7 is a graph representing possible decreasing functions for the different thresholds of the method according to the invention.

In the following step, the median for the n evaluations is computed. When the median has been computed, it is checked if it verifies a rule based on a filtering threshold FT. This is represented at FIG. 6 by the block "median<FT?". Such a filtering threshold FT permits to filter the most promising parametrizations before submitting them to the resampling method which reduces its time and execution cost. The rule based on the filtering threshold FT can be verified if the median is above the filtering threshold FT, if it is below the filtering threshold FT, or if it is equal to the filtering threshold FT. For example, if the performance evaluated is the speed of execution, the rule based on the filtering threshold FT is then verified if the median is below the filtering threshold FT. The filtering threshold FT is based on a decreasing function and on the median of the evaluated performances for all values for the set of parameters, i.e. for all parametrizations previously tested. This permits to ensure that the new parametrization is better than at least a percentage of all the already tested parameterization (i.e. all the already tested values of parameters of the set of parameters). The percentage of the median used is computed dynamically as a decreasing function of the number of elapsed iterations. The decreasing function enables, as the autotuning method tries more and more parametrizations, to make sure that the optimization method converges to quality values of the set of parameters from a large quantity of possible values of the set of parameters. Possible decreasing functions for the ratio are represented at FIG. 7. Such decreasing functions include, but are not limited to, decreasing logarithmic functions or decreasing exponential functions.

Mathematically speaking, if FC is the decreasing function selected to perform the filtering, it is ensured that each time a new parametrization y is selected at step t, it is evaluated n times (here twice) and the performance $F(y)_1$ and $F(y)_2$ verifies:

$$\mathrm{median}(F(y)_1, F(y)_2) \leq FC(t) \times \mathrm{globalmedian}$$

where globalmedian corresponds to the median of all the other performance evaluations up to this new parametrization and the filtering threshold FT is $FC(t) \times \mathrm{globalmedian}$.

If the median of the evaluated performances does not verify the rule based on the filtering threshold FT, the current value of the set of parameters is discarded and the method M2 is restarted with at least one other value for at least one parameter of the set of parameters generated by the optimization module H1, that is, with a different parametrization. That is represented at FIG. 6 by the "new param" block. Indeed, the fact that the median of the evaluated performances does not verify the rule based on the filtering threshold FT means that the current parameterization is not promising compared to the other previously tested parameterizations.

If the median of the evaluated performances verifies the rule based on the filtering threshold FT, a resampling method is performed. The resampling method is based on the median of the evaluated performances and on a confidence interval decreasing with the number of steps of the method.

The resampling method of one or more embodiments of the invention includes evaluating if the standard error of the median verifies a rule based on a decreasing function, if the rule is not verified, the performance is evaluated another time. If the rule is verified, the optimization method is stopped for this value of the set of parameters. If the budget is not spent, another value of the set of parameters is then generated by the optimization module H1, the method M2 is started back from the beginning. If the budget is spent, the parametrization that showed the best performances is confirmed to run the application in the tuned HPC system 11.

Therefore, in the next step, the standard error of the median of the evaluated performances for the current value of the set of parameters is computed using the older performance values evaluated. To keep the notion of standard error of the mean, a version adapted to the median is used, which relies on quartiles rather than on standard error, as introduced in Geyer, Charles J. «*Stat* 5102 *Notes: Nonparametric Tests and Confidence Intervals* », s. d., 14. That is, the equation $$k * \frac{\sigma}{\sqrt{n}}$$

is computed, where $\sigma$ is the standard deviation, n is the number of evaluations (two when n is set to two, or more when the predetermined number of times the performance Perf must be evaluated is set to a higher number) and k is a parameter dependant on the certainty wanted for the performance measure corresponding to the set of parameters. The k parameter describes the width of the confidence interval, such as for example, 90%, 95%, 99%, etc. It is determined using quantiles of the gaussian random law. The k parameter can for example take the value of 1.96, which corresponds to the 95% interval.

The fact that the rule is based on a decreasing function allows to remove the dependence on the hyperparameter threshold in prior art. Similar to the filtering threshold, the size of the confidence interval depends on the number of iterations. The size of the confidence interval is inversely proportional to the number of elapsed steps and a similar function FD as the function FC used for the filtering threshold FT can be used. A different decreasing function can also be used. The confidence interval around the median thus gets smaller and smaller as the number of iterations of the resampling process raises, as is verified:

$$k \times \frac{\sigma}{\sqrt{n}} \leq \tau \times FD(n)$$

Where k depends on the certainty wanted for the performance measure corresponding to the set of parameters and T is a predefined threshold. The threshold $\tau$ can be predetermined arbitrarily, as in the prior art. The dependence of the method of the invention on this threshold $\tau$ is greatly reduced compared to the prior art.

Figure 8:
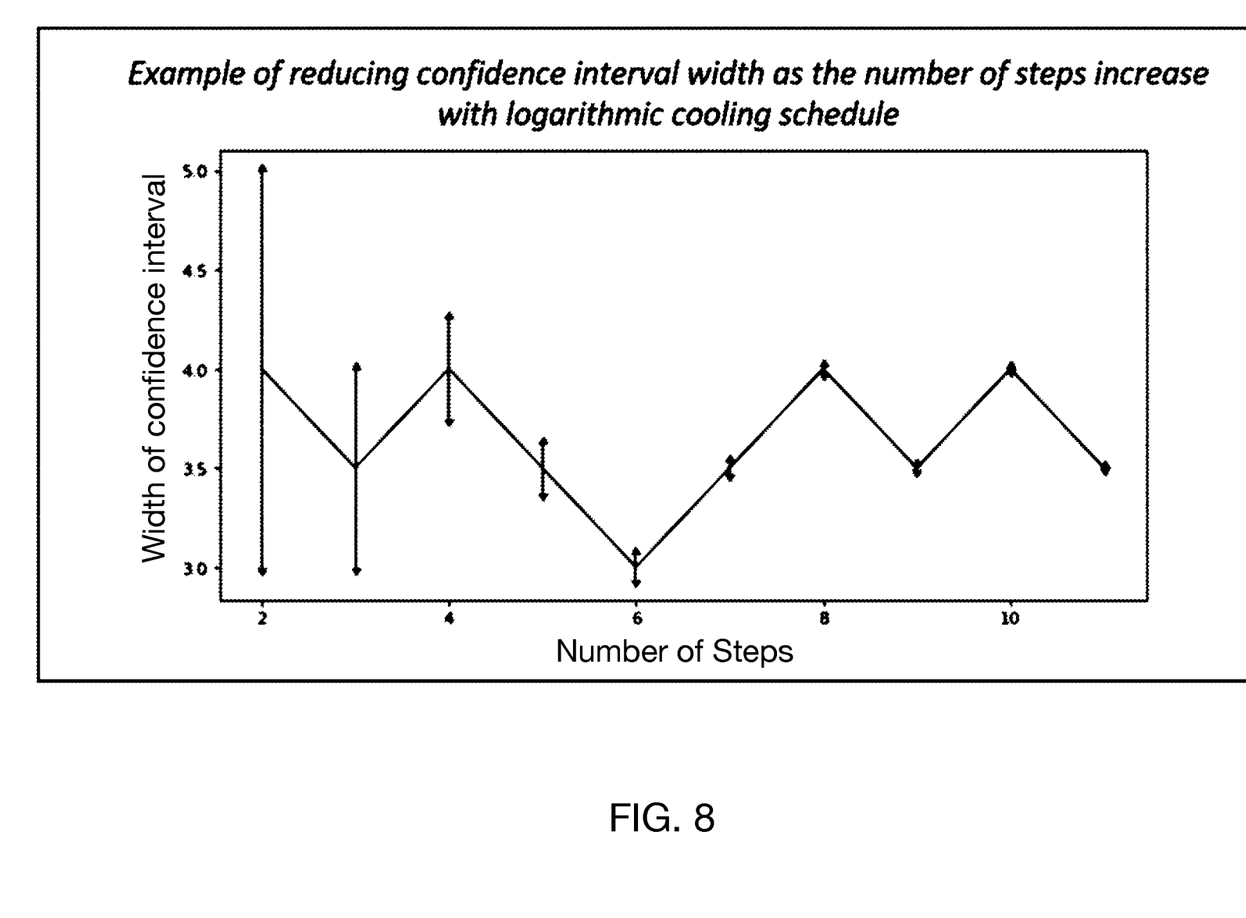
FIG. 8 is a graph representing the decreasing confidence interval according to the invention as a function of the number of steps.

FIG. 8 shows a graph representing the decreasing confidence interval with the number of steps increasing. Using a decreasing function ensures that, at the beginning of the optimization process, more parametrizations will be included, but, at the end of the optimization process, only the parametrization that provide the best performances are kept. Indeed, the parametrizations having the worst performance will be rapidly out of the confidence interval that shrinks with the steps, while the parametrizations having the best performance will stay inside the confidence interval.

What is claimed is:

1. A method for autotuning a high-performance computing system, at least part of the high-performance computing system having an evaluable performance and being able to be parameterized using a set of parameters, each parameter having at least one value, the evaluable performance being dependent on values of parameters of the set of parameters, the method being carried out by a computing device, an optimization module being configured to generate at least one current value of at least one parameter of the set of parameters as a function of at least one previously measured performance of the high-performance computing system, the method comprising:

if the evaluable performance has not been evaluated at least a predetermined number of times with current values of the set of parameters:
  evaluating the evaluable performance of the high-performance computing system with the current values of the set of parameters;
if the evaluable performance has been evaluated at least said predetermined number of times with the current values of the set of parameters:
  computing a median of evaluated performances with the current values of the set of parameters,
  if the median of said evaluated performances does not verify a rule based on a filtering threshold, discard the current values of the set of parameters and restart the method with at least one other value for said at least one parameter of the set of parameters generated by the optimization module,
  if the median of said evaluated performances verifies the rule based on the filtering threshold, performing a resampling method based on the median of the evaluated performances and on a confidence interval decreasing with a number of steps of the optimization module.

2. The method according to claim 1 wherein the predetermined number of times the evaluable performance must be evaluated is two.

3. The method according to claim 2 wherein the method further comprises, after computing the median of the evaluated performances, computing a value of the filtering threshold based on a decreasing function and on the median of the evaluated performances for all values of the set of parameters.

4. The method according to claim 1 wherein the rule based on the filtering threshold is one of: a rule verified if evaluated performance is above the filtering threshold, a rule verified if the evaluated performance is under the filtering threshold, and a rule verified if the evaluated performance is equal to the filtering threshold.

5. The method according to claim 1 wherein the resampling method comprises a first step of evaluating performance of the high-performance computing system with the current values of the set of parameters, and if a standard error of the median of the evaluated performances with the current values of the set of parameters does not verify the rule based on the confidence interval, performing the resampling method again or, if the standard error of the median of the evaluated performances for the current values of the set of parameters verifies the rule based on the confidence interval, stopping the resampling method for the current values of the set of parameters.

6. The method according to claim 5 wherein the confidence interval of the rule based on the confidence interval is computed based on a decreasing function.

7. The method according to claim 6 wherein the decreasing function is a decreasing logarithmic function or a decreasing exponential function.

8. A system for autotuning said high-performance computing system it wherein said system comprises at least one optimization module and at least one computing device configured to carry out the method according to claim 1.

9. A non-transitory computer-readable medium comprising instructions which, when executed by said computing device, cause said computing device to carry out the method according to claim 1.

* * * * *